US011987062B2

(12) United States Patent
Kato et al.

(10) Patent No.: US 11,987,062 B2
(45) Date of Patent: May 21, 2024

(54) METHOD FOR CORRECTING IMAGE AND PRINTING APPARATUS

(71) Applicant: BROTHER KOGYO KABUSHIKI KAISHA, Nagoya (JP)

(72) Inventors: Daiki Kato, Nagoya (JP); Hiroto Sugahara, Ama (JP); Taro Nagano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 127 days.

(21) Appl. No.: 17/818,832

(22) Filed: Aug. 10, 2022

(65) Prior Publication Data

US 2023/0091544 A1 Mar. 23, 2023

(30) Foreign Application Priority Data

Sep. 21, 2021 (JP) ................................ 2021-153600

(51) Int. Cl.
*B41J 2/21* (2006.01)
*B41J 2/045* (2006.01)

(52) U.S. Cl.
CPC ......... *B41J 2/2146* (2013.01); *B41J 2/04508* (2013.01)

(58) Field of Classification Search
CPC ............................ B41J 2/2146; B41J 2/04508
See application file for complete search history.

(56) References Cited

U.S. PATENT DOCUMENTS

| | | | | |
|---|---|---|---|---|
| 2010/0182366 A1 | | 7/2010 | Takagi et al. | |
| 2012/0133696 A1* | | 5/2012 | Tomita | B41J 2/2142 347/14 |
| 2012/0242729 A1 | | 9/2012 | Takahashi et al. | |

FOREIGN PATENT DOCUMENTS

| | | | | |
|---|---|---|---|---|
| CN | 1572497 A | * | 2/2005 | B41J 2/2054 |
| EP | 0 968 832 A1 | | 1/2020 | |
| JP | 2007-30503 A | | 2/2007 | |
| JP | 2007-301952 A | | 11/2007 | |
| JP | 2020-1228 A | | 1/2020 | |
| JP | 2020-69693 A | | 5/2020 | |
| JP | 2020-69784 A | | 5/2020 | |

OTHER PUBLICATIONS

Extended European Search Report issued in corresponding European Patent Application 22187830.9, dated Jan. 9, 2023.

* cited by examiner

*Primary Examiner* — Justin Seo
(74) *Attorney, Agent, or Firm* — Merchant & Gould P.C.

(57) ABSTRACT

A method for correcting an image includes: moving first and second ink jet heads and a medium relative to each other, each of the first and second ink jet heads including nozzles and drive elements corresponding to the nozzles respectively; discharging ink droplets from the nozzles of the first and second ink jet heads, by connecting each of the drive elements to one of power supply circuits and by applying voltage to each of the drive elements, the power supply circuits having different output voltage values each other; determining a density difference between a first image region and a second image region; and switching the voltage to be applied to first drive elements to a first voltage by switching the power supply circuits to be connected to the first drive elements based on the density difference.

9 Claims, 11 Drawing Sheets

METHOD FOR CORRECTING IMAGE AND PRINTING APPARATUS

REFERENCE TO RELATED APPLICATIONS

This application claims priority from Japanese Patent Application No. 2021-153600 filed on Sep. 21, 2021. The entire content of the priority application is incorporated herein by reference.

BACKGROUND ART

Hitherto, there is known a method where, in a printing apparatus including a plurality of ink jet heads, density differences in printed images occurring among the ink jet heads are corrected. For example, there is known a method where the density differences in printed images occurring among the ink jet heads are corrected by adjusting drive voltages for each of the ink jet heads.

DESCRIPTION

However, in a case that the drive voltages are adjusted for each of the ink jet heads, there has been a risk that discharge speed of ink droplets will become slower, and landing positions of the ink droplets will deviate from desired positions in an ink jet head where the drive voltage has been lowered, and a risk that mist will be generated in an ink jet head where the drive voltage has been raised. Therefore, in a case that the drive voltages are adjusted for each of the ink jet heads, there has been a risk that a desired image quality may not be obtained.

The present teaching, which was made in order to solve the above-described kind of problem, has an object of providing technology by which, in a printing apparatus including a plurality of ink jet heads, density differences in printed images occurring among the ink jet heads are corrected while minimizing image quality degradation.

According to a first aspect of the present teaching, there is provided a method for correcting an image, including: moving first and second ink jet heads and a medium relative to each other, the first and second ink jet heads being arranged along a first direction, each of the first and second ink jet heads including nozzles and drive elements corresponding to the nozzles respectively, the first and second ink jet heads and the medium being moved relative to each other in a second direction intersecting with the first direction; discharging ink droplets from the nozzles of the first and second ink jet heads, by connecting each of the drive elements to one of power supply circuits and by applying voltage to each of the drive elements at a predetermined timing while moving the first and second ink jet heads and the medium in the second direction, the power supply circuits having different output voltage values each other; determining a density difference between a first image region and a second image region, the first image region being formed on the medium by the ink droplets discharged from first nozzles, the first nozzles being included in the nozzles of the first ink jet head and being positioned in an end portion on one side in the first direction among the nozzles of the first ink jet head, the second image region being formed on the medium by the ink droplets discharged from second nozzles, the second nozzles being included in the nozzles of the second ink het head and being positioned in an end portion on the other side in the first direction among the nozzles of the second ink jet head; and switching the voltage to be applied to first drive elements to a first voltage by switching the power supply circuits to be connected to the first drive elements based on the density difference, the first drive elements being included in the drive elements of the first ink jet head and corresponding to the first nozzles, the first voltage being different from the voltage to be applied to drive elements, of the first ink jet head, other than the first drive elements.

According to a second aspect of the present teaching, there is provided a printing apparatus comprising: power supply circuits having different output voltage values each other; first and second ink jet heads arranged along a first direction, each of the first and second ink jet heads including nozzles and drive elements corresponding to the nozzles respectively; a moving mechanism configured to move the first and second ink jet heads and a medium relative to each other in a second direction intersecting with the first direction; and a controller configured to control the first and second ink jet heads and the moving mechanism, wherein each of the drive elements included in the first and second ink jet heads is connected to one of the power supply circuits, the controller is configured to apply voltage to each of the drive elements included in the first and second ink jet heads at a predetermined timing while moving the first and second ink jet heads and the medium in the second direction relative to each other such that ink droplets are discharged from the nozzles included in the first and second ink jet heads, the nozzles of the first ink jet head include first nozzles positioned in an end portion on one side in the first direction, the nozzles of the second ink jet head include second nozzles positioned in an end portion on the other side in the first direction, a first image region is formed on the medium by the ink droplets discharged from the first nozzles, a second image region is formed on the medium by the ink droplets discharged from the second nozzles, the drive elements of the first ink jet head include first drive elements corresponding to the first nozzles, and the controller is configured to switch the voltage to be applied to the first drive elements to a first voltage by switching the power supply circuits to be connected to the first drive elements based on a density difference between the first image region and the second image region, the first voltage being different from the voltage to be applied to drive elements, of the first ink jet head, other than the first drive elements.

The first and second aspects of the present teaching make possible that, in a printing apparatus comprising a plurality of ink jet heads, differences in density of printed image occurring among the ink jet heads are corrected while lowering of image quality is suppressed.

A printing apparatus according to an embodiment of the present teaching will be described below with reference to FIGS. 1 to 10.

Figure 1:
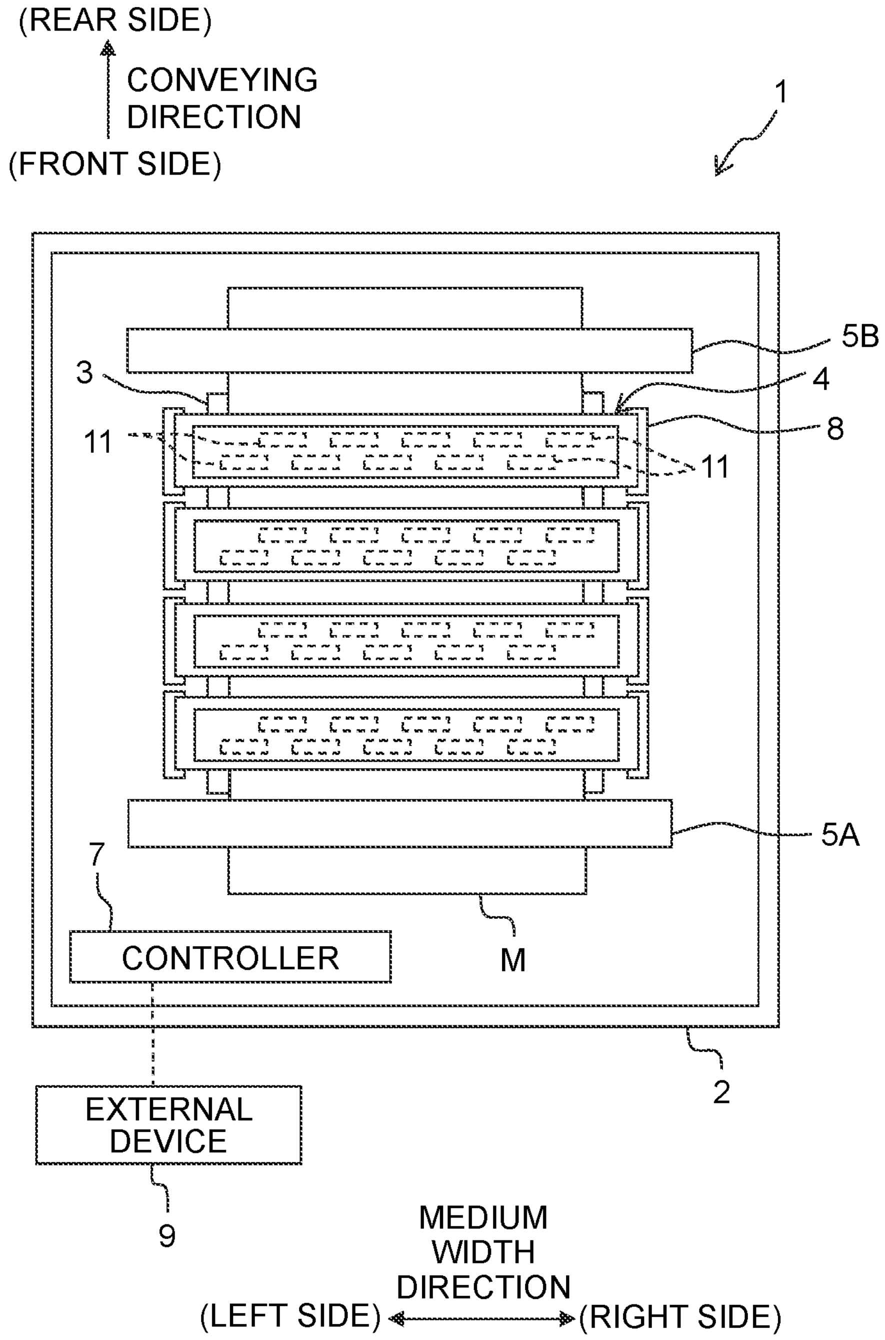
FIG. 1 is a plan view depicting one example of main configuration of a printing apparatus of the present embodiment.

In FIG. 1, an upstream side in a conveying direction of a print medium M is defined as a front side of a printing apparatus 1, and a downstream side in the conveying direction of the print medium M is defined as a rear side of the printing apparatus 1. Moreover, a direction parallel to a plane along which the print medium M is conveyed (a plane parallel to a paper surface of FIG. 1) and orthogonal to the conveying direction is defined as a medium width direction. Note that a left side in FIG. 1 is a left side of the printing apparatus 1, and a right side in FIG. 1 is a right side of the printing apparatus 1. Furthermore, a direction orthogonal to a conveying surface of the print medium M (a direction orthogonal to the paper surface of FIG. 1) is defined as an up-down direction of the printing apparatus 1. In FIG. 1, a front side of the paper surface is an upper side, and a back side of the paper surface is a lower side. Description below will be made making appropriate use of front-rear, left-right, and up-down. Note that in the present embodiment, the medium width direction is one example of a "first direction" of the present teaching, and the conveying direction is one example of a "second direction" of the present teaching.

As depicted in FIG. 1, the printing apparatus 1 includes a casing 2, a platen 3, four line heads 4, two conveying rollers 5A, 5B, and a controller 7.

The print medium M such as paper, for example, is conveyed on an upper surface of the platen 3. The four line heads 4 are parallelly arranged in a front-rear direction above the platen 3. The two conveying rollers 5A, 5B are respectively disposed on a front side and rear side of the platen 3. The two conveying rollers 5A, 5B, which are each driven by an unillustrated motor, convey rearwards the print medium M on the platen 3. Note that although in the present embodiment, there is a configuration of the printing apparatus 1 comprising four line heads 4, the number of line heads 4 is not limited to four.

Figure 3:
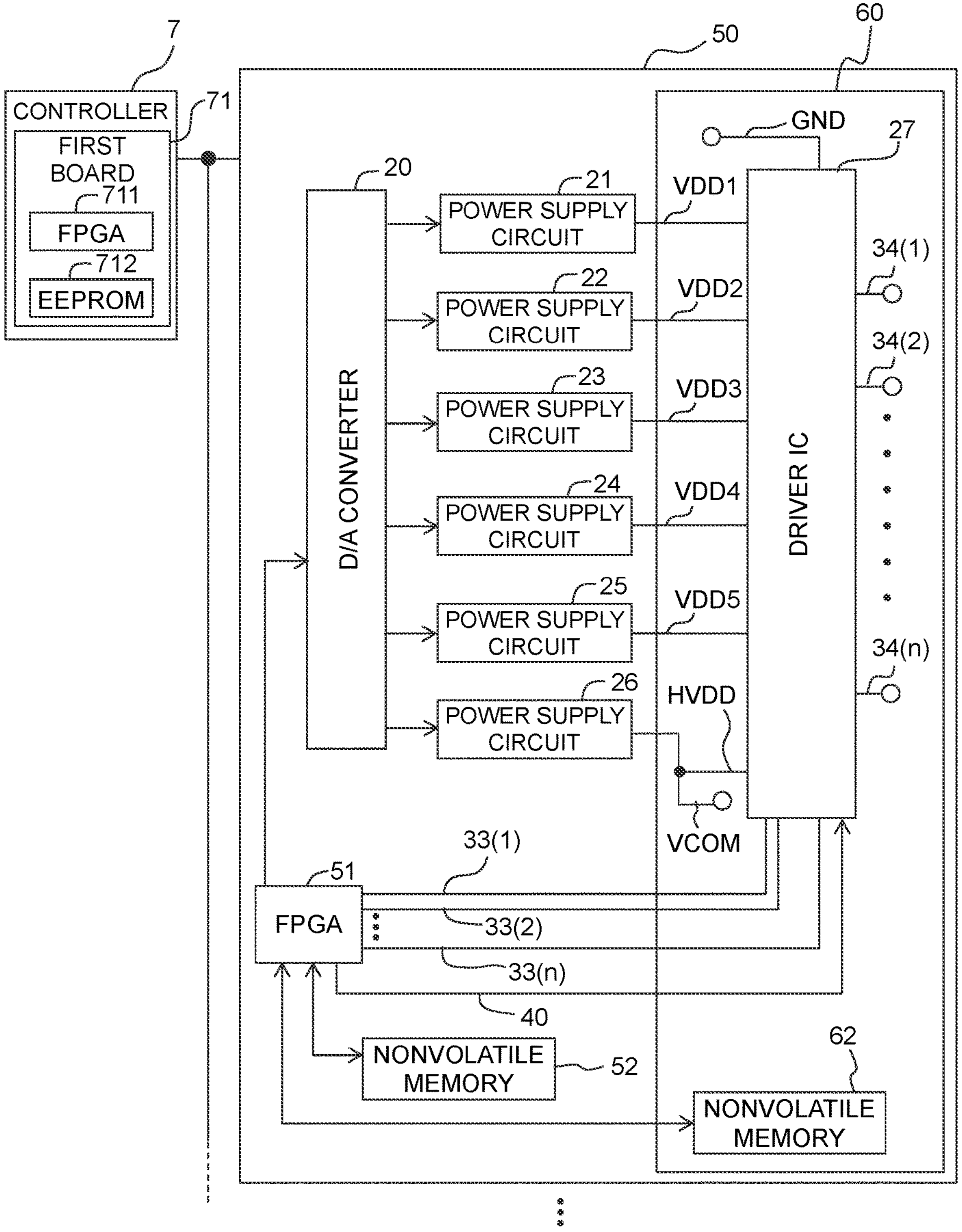
FIG. 3 is a block diagram depicting one example of configuration of a second board included in the head of the present embodiment and a flexible circuit board connected to the second board.

As depicted in FIG. 3, the controller 7 includes a first board 71. The first board 71 includes an FPGA (Field Programmable Gate Array) 711, and, in addition, includes an unillustrated ROM (Read Only Memory), an unillustrated RAM (Random Access Memory), an EEPROM (Electrically Erasable Programmable Read-Only Memory) 712, and so on. The controller 7 is capable of intercommunicating with an external device 9 such as a personal computer. The controller 7 controls operation of each line head 4 and the conveying rollers 5A, 5B according to a program stored in said ROM, by an instruction from an operating unit (not illustrated) with which the external device 9 or printing apparatus 1 is equipped. Note that a CPU (Central Processing Unit) or MPU (Microprocessor Unit) may be used instead of the FPGA 711.

For example, the controller 7 controls the motor driving the conveying rollers 5A, 5B and thereby causes the conveying rollers 5A, 5B to convey the print medium M in the conveying direction. Moreover, the controller 7 controls each of the line heads 4 to cause them to discharge ink toward the print medium M. As a result, an image is printed on the print medium M. Note that the print medium M may be a roll-like medium consisting of a feeder roll including an upstream end in the conveying direction of the print medium M and a collector roll including a downstream end in the conveying direction of the print medium M. In this case, the feeder roll may be fitted to the conveying roller 5A on the upstream side in the conveying direction, and the collector roll may be fitted to the conveying roller 5B on the downstream side in the conveying direction. Alternatively, the print medium M may be a roll-like medium that includes only a feeder roll including an upstream end in the conveying direction of the print medium M. In this case, the feeder roll may be fitted to the conveying roller 5A on the upstream side in the conveying direction.

The casing 2 is fitted with four head holders 8, correspondingly to the four line heads 4. The four head holders 8 are parallelly arranged to front and rear at positions above the platen 3 and between the conveying rollers 5A, 5B. Each head holder 8 holds one line head 4.

The four line heads 4 respectively discharge inks of four colors, namely, cyan (C), magenta (M), yellow (Y), and black (K). Each of the line heads 4 is supplied with its corresponding one color of ink from an unillustrated ink tank.

As depicted in FIG. 1, each of the line heads 4 of the present embodiment includes 10 heads 11. The 10 heads 11 are disposed in two columns in a zig-zag manner along the medium width direction. Since one line head 4 is supplied with one color of ink, said one color of ink is discharged from the 10 heads 11 included in said one line head 4. Note that although in the present embodiment, there is a configuration of the line head 4 comprising 10 heads 11, the number of heads 11 is not limited to 10.

Figure 2:
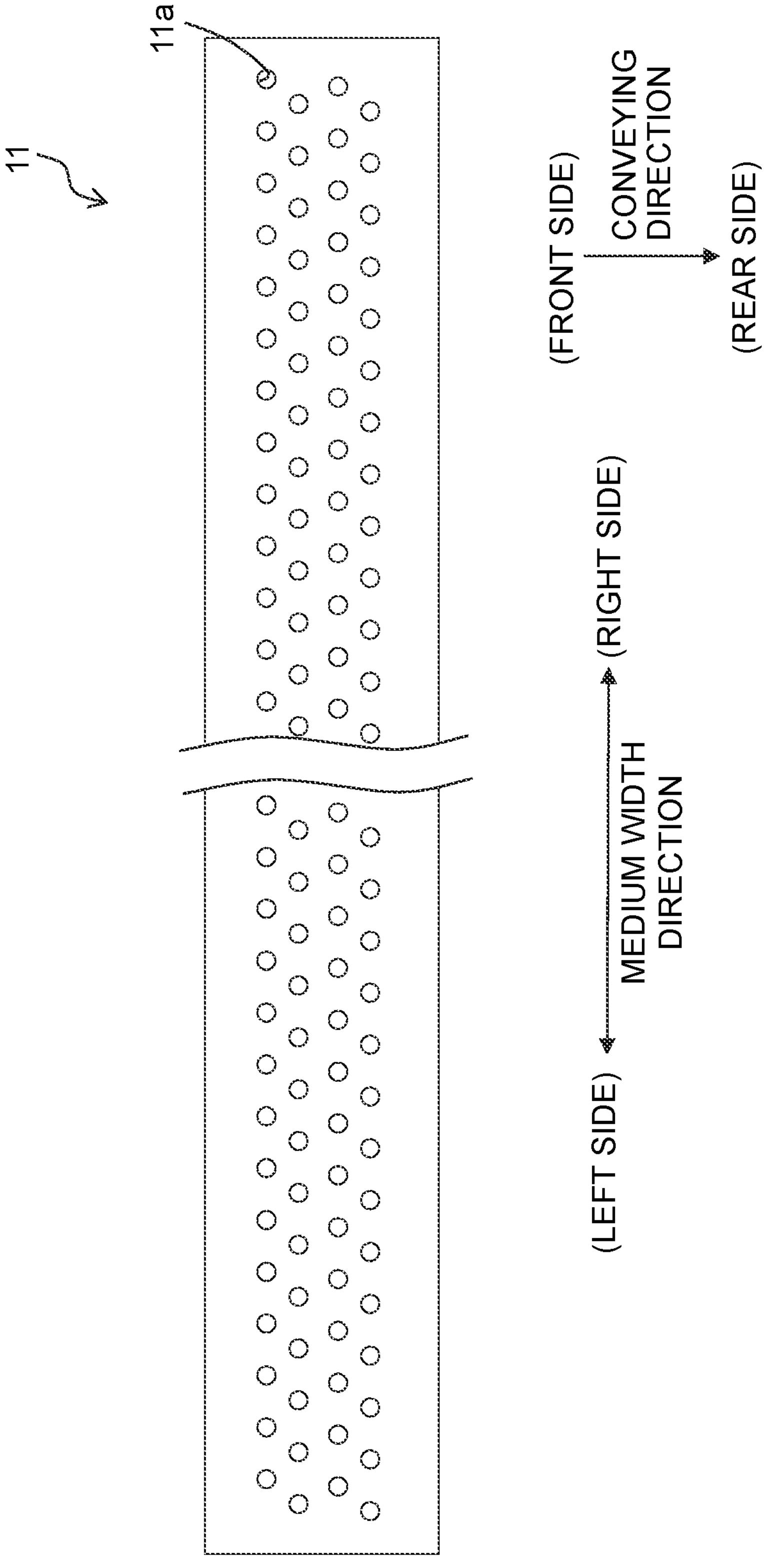
FIG. 2 is a bottom view depicting one example of a head of the present embodiment.

As depicted in FIG. 2, a plurality of nozzles 11*a* opens in a bottom surface of each head 11 of the present embodiment. The plurality of nozzles 11*a* forms a plurality of nozzle columns aligned in the medium width direction. Moreover, each nozzle column is formed by a plurality of nozzles 11*a* aligned in a zig-zag manner along a direction intersecting the conveying direction and the medium width direction. A position of each nozzle 11*a* in each head 11 is uniquely specified by the nozzle column to which said nozzle 11*a* belongs and position in the conveying direction of said nozzle 11*a*.

Moreover, each head 11 is provided with: the same number of drive elements 111 (to be mentioned later) as it has nozzles 11*a*; and a second board 50 and flexible circuit board 60. Since the printing apparatus 1 of the present embodiment includes four line heads 4, and each line head 4 includes 10 heads 11, the printing apparatus 1 includes 40 heads 11. Hence, the number of second boards 50 will be 40, and the number of flexible circuit boards 60 connected to the second boards 50 will be 40. As depicted in FIG. 3, the first board 71 of the controller 7 is connected to the 40 second boards 50. Note that in FIG. 3, for convenience, only one second board 50 and one flexible circuit board 60 are depicted.

The second board 50 includes an FPGA 51, a nonvolatile memory 52 such as an EEPROM, or the like, a D/A converter 20, power supply circuits 21-26, and so on. Note that although in the present embodiment, the second board

50 includes the six power supply circuits 21-26, the number of power supply circuits is not limited to six. Moreover, the flexible circuit board 60 includes a nonvolatile memory 62 such as an EEPROM, or the like, a driver IC 27, and so on.

The FPGA 51 outputs to the D/A converter 20 a digital setting signal for setting output voltages of the power supply circuits 21-26, under control of the FPGA 711 provided in the first board 71.

The D/A converter 20 converts to an analog setting signal the digital setting signal outputted by the FPGA 51, and outputs the analog setting signal to the power supply circuits 21-26.

The power supply circuits 21-26 can each be configured as, for example, a DC/DC converter that is configured by a plurality of electronic components such as a FET, an inductor, a resistor, an electrolytic condenser, and so on. Each of the power supply circuits 21-26 outputs to the driver IC 27 the output voltage set by the setting signal. In the present embodiment, the power supply circuits 21-26 are all set so that their output voltages differ. For example, the output voltage of the power supply circuit 21 is 16 V, the output voltage of the power supply circuit 22 is 17 V, the output voltage of the power supply circuit 23 is 18 V, the output voltage of the power supply circuit 24 is 19 V, the output voltage of the power supply circuit 25 is 20 V, and the output voltage of the power supply circuit 26 is 24 V.

The driver IC 27 is connected to the power supply circuit 21 via a wiring VDD1, is connected to the power supply circuit 22 via a wiring VDD2, is connected to the power supply circuit 23 via a wiring VDD3, is connected to the power supply circuit 24 via a wiring VDD4, is connected to the power supply circuit 25 via a wiring VDD5, and is connected to the power supply circuit 26 via a wiring HVDD. Note that the power supply circuit 26 is connected via a wiring VCOM to the later-mentioned drive element 111. Although the wiring HVDD and wiring VCOM are led out as a single wiring from the power supply circuit 26, they branch into two wirings midway along their path.

The power supply circuits 21-26 are connected to waveform generating circuits 30(1)-30(*n*) (where n is the number of drive elements 111 that the head 11 has) formed inside the driver IC 27.

The waveform generating circuits 30(1)-30(*n*) are provided to correspond to the n drive elements 111 of each head 11, respectively. In other words, the waveform generating circuits 30(1)-30(*n*) are provided to correspond to the n nozzles 11*a* of each head 11, respectively. The driver IC 27 is connected to n signal lines 34(1)-34(*n*). The driver IC 27 is connected to then drive elements 111 via the n signal lines 34(1)-34(*n*). Each signal line 34 is connected to an individual electrode of the drive element 111.

Moreover, the driver IC 27 includes n selectors 90(1)-90(*n*) provided correspondingly to the n drive elements 111. Each selector 90 is a hardware configuring element configured from the likes of a plurality of FETs formed inside the driver IC 27.

The power supply circuit 26 can be used as a VCOM-dedicated power supply voltage of the drive elements 111, or as an HVDD (high-side side back-gate voltage) of later-mentioned PMOS transistors 311-315.

The nonvolatile memory 62 has stored therein the likes of a nozzle ID identifying each nozzle 11*a*, a column ID identifying the plurality of nozzle columns, and a row ID identifying a position in the conveying direction of the nozzle 11*a*. Moreover, the nonvolatile memory 52 has stored therein correspondence relationships of the n nozzles 11*a* and the five power supply circuits 21-25, for example. Note that these items of information may be stored in the nonvolatile memory 62 provided in the flexible circuit board 60, rather than in the nonvolatile memory 52.

Moreover, the driver IC 27 is connected to the FPGA 51 via n control lines 33(1)-33(*n*) and a control line 40. The control lines 33(1)-33(*n*) are control lines provided correspondingly to the above-mentioned n waveform generating circuits 30(1)-30(*n*). Each control line 33 has propagated therein a signal for controlling a FET provided in each waveform generating circuit 30. In accordance with this signal, the waveform generating circuit 30 generates a drive signal for driving the drive element 111, and outputs the generated drive signal to the drive element 111 via the signal line 34.

Moreover, the control line 40 has transmitted therethrough a control signal for controlling the n selectors 90(1)-90(*n*) that the driver IC 27 has. The FPGA 51 controls the n selectors 90(1)-90(*n*) to select the power supply circuit for generating the drive signal to be outputted to each signal line 34.

Figure 4:
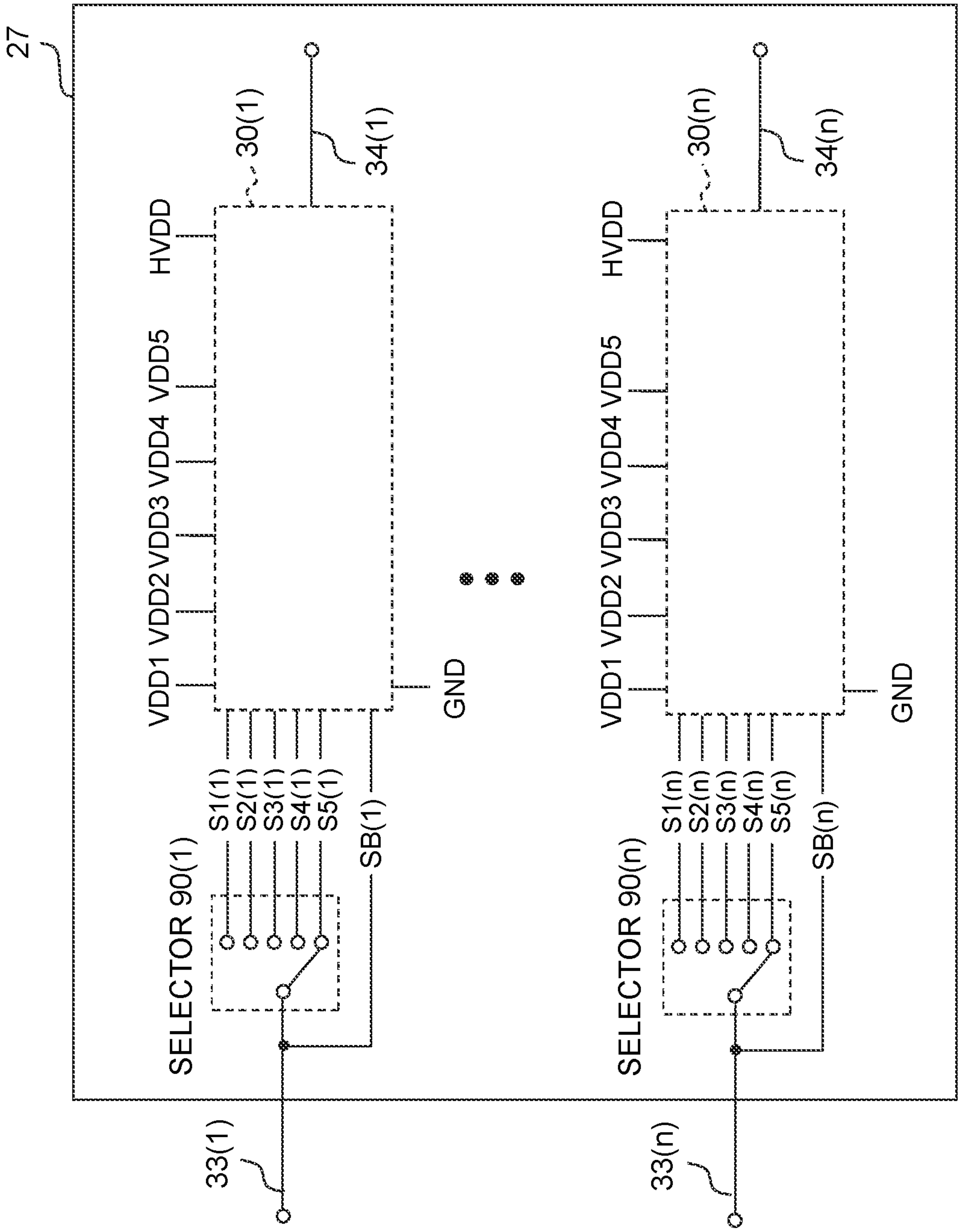
FIG. 4 is a diagram depicting one example of circuit configuration in a driver IC.

Next, one example of circuit configuration in the driver IC 27 will be described with reference to FIG. 4. As depicted in FIG. 4, the driver IC 27 includes: the n waveform generating circuits 30(1)-30(*n*); and the n selectors 90(1)-90(*n*) provided correspondingly to each of the waveform generating circuits 30(1)-30(*n*).

Since the driver IC 27 includes the same number n portions of a similar configuration as the number of nozzles, there will be described below representatively a circuit configuration provided between the control line 33(1) and the signal line 34(1). The driver IC 27 has formed therein between the control line 33(1) and signal line 34(1) the selector 90(1) and waveform generating circuit 30(1).

The control line 33(1) from the FPGA 51 is connected to the selector 90(1). The control line 33(1) branches midway along a path joining the FPGA 51 and the selector 90(1), and a control line SB(1) that has branched off from the control line 33(1) is connected to the waveform generating circuit 30(1).

The selector 90(1) and the waveform generating circuit 30(1) are connected by five control lines S1(1), S2(1), S3(1), S4(1), and S5(1). The selector 90(1) connects any one control line selected from among the five control lines S1(1), S2(1), S3(1), S4(1), and S5(1) to the control line 33(1), in accordance with an instruction from the FPGA 51.

The waveform generating circuit 30(1) is connected with: five wirings connected to the above-mentioned wirings VDD1-VDD5; a wiring connected to the above-mentioned wiring HVDD; and a wiring connected to a wiring GND.

Figure 5:
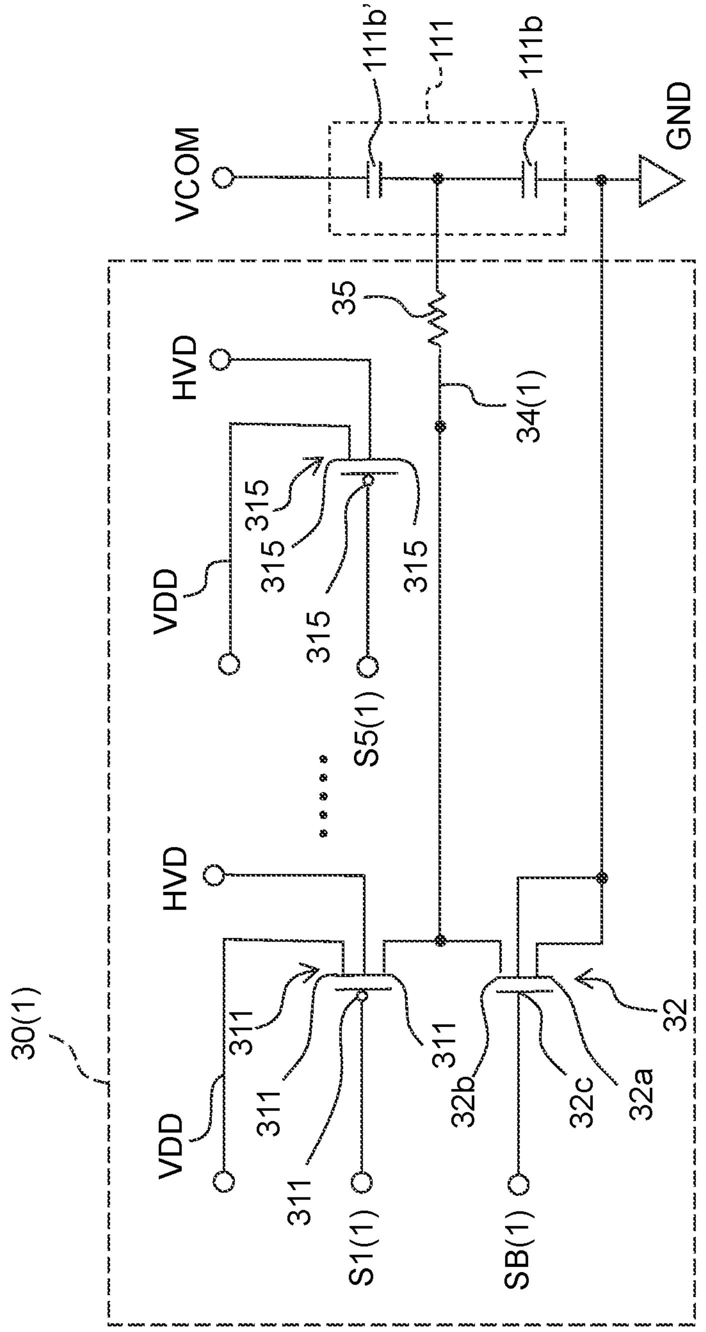
FIG. 5 is a circuit diagram depicting one example of configuration of a waveform generating circuit in the driver IC.

Next, one example of configuration of the waveform generating circuits 30(1)-30(*n*) that the head 11 of the present embodiment includes, will be described with reference to FIG. 5. Note that since the waveform generating circuits 30(1)-30(*n*) have similar configurations, there will be described below the waveform generating circuit 30(1). The waveform generating circuit 30(1) includes the five PMOS (P-type Metal Oxide Semiconductor) transistors 311-315 (of which only two are illustrated in FIG. 5), one NMOS (N-type Metal Oxide Semiconductor) transistor 32, a resistor 35, and so on. The waveform generating circuit 30(1) is connected to the individual electrode of the drive element 111 via the signal line 34(1).

The drive element 111 of the present embodiment is a piezoelectric element in which a single pressure chamber is provided with: a first active portion sandwiched between the individual electrode and a first constant-potential electrode; and a second active portion sandwiched between the individual electrode and a second constant-potential electrode. For this purpose, the drive element 111 includes a capacitor 111*b* and a capacitor 111*b*'. The capacitor 111*b* corresponds to the individual electrode, the second constant-potential electrode, and a piezoelectric body sandwiched between these electrodes, and the capacitor 111*b*' corresponds to the individual electrode, the first constant-potential electrode, and a piezoelectric body sandwiched between these electrodes.

Five source terminals 311*a*-315*a* of the five PMOS transistors 311-315 are respectively connected with the wirings VDD1-VDD5. Source terminal 32*a* of the NMOS transistor 32 is connected to ground. In other words, the PMOS transistor 311 is connected to the power supply circuit 21 via the wiring VDD1. The PMOS transistor 312 is connected to the power supply circuit 22 via the wiring VDD2. The PMOS transistor 313 is connected to the power supply circuit 23 via the wiring VDD3. The PMOS transistor 314 is connected to the power supply circuit 24 via the wiring VDD4. The PMOS transistor 315 is connected to the power supply circuit 25 via the wiring VDD5.

Gate terminal 311*c* of the PMOS transistor 311 is connected with the control line S1(1). Gate terminal 312*c* of the PMOS transistor 312 is connected with the control line S2(1). Gate terminal 313*c* of the PMOS transistor 313 is connected with the control line S3(1). Gate terminal 314*c* of the PMOS transistor 314 is connected with the control line S4(1). Gate terminal 315*c* of the PMOS transistor 315 is connected with the control line S5(1). Moreover, gate terminal 32*c* of the NMOS transistor 32 is connected with the control line SB(1).

Moreover, drain terminals 311*b*-315*b* of the five PMOS transistors 311-315 are connected to a one end of the resistor 35. In addition, drain terminal 32*b* of the NMOS transistor 32 is connected to the one end of the resistor 35. Another end of the resistor 35 is connected to the individual electrode (another end of the capacitor 111*b*' and a one end of the capacitor 111*b*) of the drive element 111. The first constant-potential electrode (a one end of the capacitor 111*b*') of the drive element 111 is connected to VCOM, and the second constant-potential electrode (another end of the capacitor 111*b*) of the drive element 111 is connected to ground.

When the FPGA 51 outputs a signal of low level ("L") to the control line 33(1), the any one PMOS transistor connected to the signal line selected by the above-mentioned selector 90(1), of the PMOS transistors 311-315 attains an ON state. The capacitor 111*b* is charged by the voltage supplied from some one of the power supply circuits 21-25, and the capacitor 111*b*' is discharged. On the other hand, when the FPGA 51 outputs a signal of high level ("H") to the control line 33(1), the NMOS transistor 32 attains an ON state, the capacitor 111*b*' is charged by the voltage outputted from some one of the power supply circuits 21-25, and the capacitor 111*b* is discharged. Due to the capacitors 111*b*, 111*b*' alternately performing charging and discharging, the drive element 111 is deformed and ink is discharged from a discharge port of the nozzle 11*a*.

That is, the signal line 34(1) receives output of the drive signal to drive the drive element 111. By the selector 90(1) selecting from among the five control lines S1(1)-S5(1) one control line to be connected, the power supply circuit to generate the drive signal can be selected from among the power supply circuits 21-25.

Figure 6:
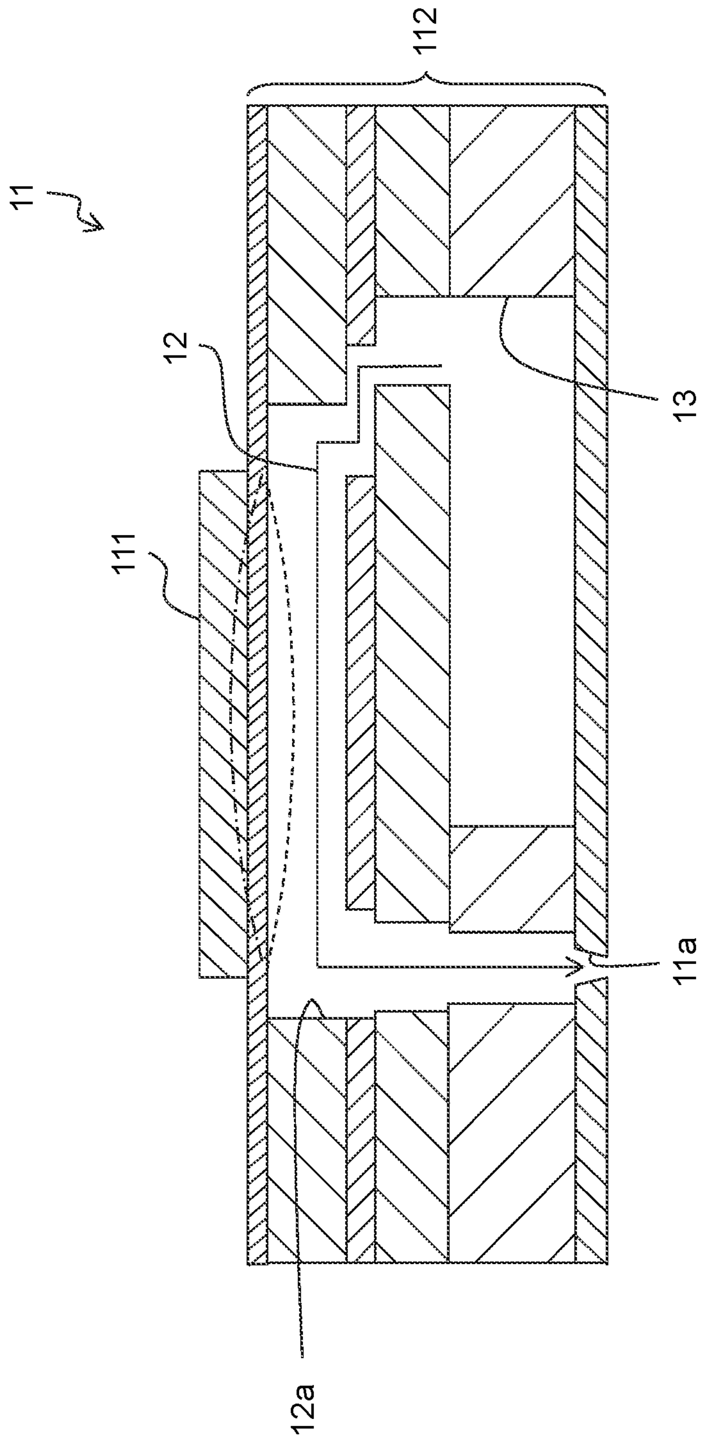
FIG. 6 is a cross-sectional view of an individual channel formed in the head of the present embodiment.

Now, a channel board 112 configuring each head 11 will be described. The channel board 112 has formed therein the plurality of nozzles 11*a*, a plurality of individual channels 12 respectively communicating with the plurality of nozzles 11*a*, and a common channel 13 communicating with the plurality of individual channels 12. Moreover, the plurality of drive elements 111 is disposed in the channel board 112 in such a manner that they respectively correspond to the plurality of individual channels 12. As depicted in FIG. 6, each individual channel 12 includes a pressure chamber 12*a*, and each drive element 111 is disposed so as to face the pressure chamber 12*a*. The common channel 13 is supplied with ink from an unillustrated ink supply unit via an ink supply port provided in the channel board 112, and ink that has been supplied to the common channel 13 is supplied to each individual channel 12.

Then, when a voltage is applied to the individual electrode of the drive element 111, the capacitor 111*b* attains an active state, and the drive element 111 deforms convexly toward the pressure chamber 12*a*. Consequently, the pressure chamber 12*a* deforms as depicted by the broken line of FIG. 6, and its volume decreases. Subsequently, when the voltage ceases to be applied to the individual electrode, the capacitor 111*b*' attains an active state, and the drive element 111 deforms convexly in a direction of separating from the pressure chamber 12*a*. Consequently, the pressure chamber 12*a* deforms as depicted by the one dot chain line of FIG. 6, and its volume increases. As a result, ink is drawn into the pressure chamber 12*a* from the common channel 13. Then, subsequently, when a voltage is again applied to the individual electrode, the capacitor 111*b* attains an active state, and the drive element 111 again deforms convexly toward the pressure chamber 12*a*. As a result, volume of the pressure chamber 12*a* again decreases, and ink is discharged from the nozzle 11*a*. Thus, by the drive element 111 repeating deformation, ink is continuously discharged from its corresponding nozzle 11*a*. Note that ink droplets of different sizes can be discharged from each nozzle 11*a*, depending on a kind of drive signal that has been generated by the waveform generating circuit 30.

Figure 7:
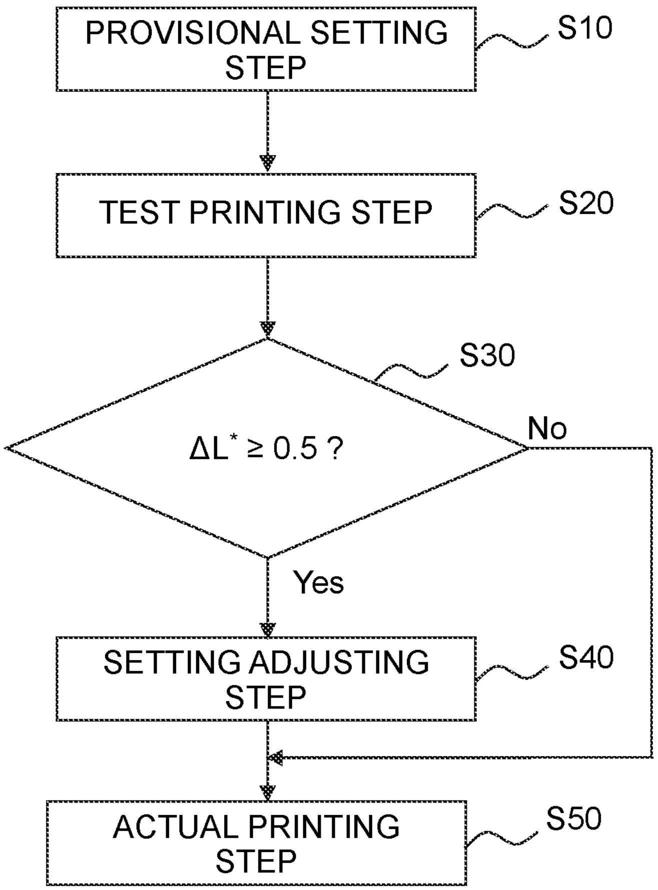
FIG. 7 is a flowchart depicting an outline of a flow of printing where the printing apparatus of the present embodiment has been used.

Next, a printing method by utilizing the printing apparatus 1 of the present embodiment will be described. As depicted in FIG. 7, the printing method by utilizing the printing apparatus 1 of the present embodiment includes a provisional setting step S10, a test printing step S20, a density difference determining step S30, a setting adjusting step S40, and an actual printing step S50.

First, in the provisional setting step S10, for each head 11, all of the drive elements 111 are applied with the same voltage, and ink is caused to be discharged onto the print medium M from all of the nozzles 11*a*, whereby a pattern consisting of a plurality of dots aligned in the medium width direction is printed. At this time, any one of the power supply circuits 21-25 may be corresponded to all of the nozzles 11*a*, or, having temporarily matched all of the power supply circuits 21-25 to the same output voltage, each nozzle 11*a* may be corresponded with any of the power supply circuits 21-25. Now, discharge characteristics of the plurality of nozzles 11*a* gently change according to position in the medium width direction and conveying direction, due to effects of slight error in diameter of the nozzle 11*a*, manufacturing error of the drive element 111, residual stress inside the head 11 generated during manufacture, and so on. Therefore, even if all of the drive elements are applied with the same voltage, density of formed dots will not necessarily be uniform. Accordingly, in the provisional setting step S10, density of the pattern printed on the print medium M is measured by a densitometer, and the power supply circuit to be associated with each nozzle 11*a* is provisionally determined so as to prevent density variation occurring within each head 11, based on a measurement result.

Figure 8:
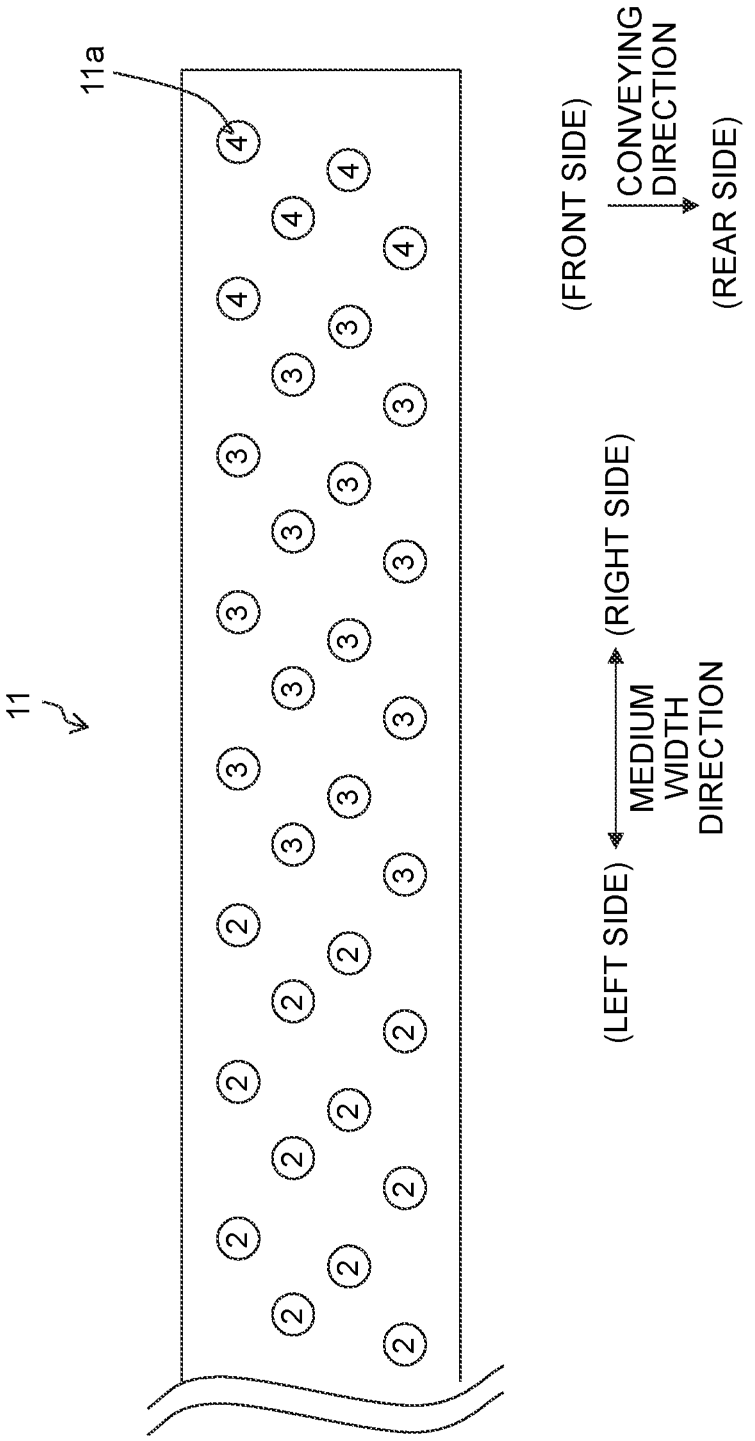
FIG. 8 is a diagram depicting a situation where each of nozzles is associated with one of power supply circuits by a provisional setting step.

For example, density is measured for each of five dots consecutive in the medium width direction. Then, based on the measured densities, all nozzles 11*a* are allocated to any one of three density groups that have been set with reference to a median value of the measured densities. For example, a group including the median value of the measured densities is assumed to be a second group, and a group where density is higher than the second group is assumed to be a first group and group where density is lower than the second group assumed to be a third group. Then, the nozzles 11*a* that have been allocated to the first group are associated with the power supply circuit 22. The nozzles 11*a* that have been allocated to the second group are associated with the power supply circuit 23 whose output voltage is larger than that of the power supply circuit 22. The nozzles 11*a* that have been allocated to the third group are associated with the power supply circuit 24 whose output voltage is larger than that of the power supply circuit 23. FIG. 8 depicts an example where in the provisional setting step (S10), the first through fifth nozzles 11*a* from right in the medium width direction have been corresponded with the power supply circuit 24, the sixth through twentieth nozzles 11*a* from right in the medium width direction have been corresponded with the power supply circuit 23, and the twenty-first through thirty-second nozzles 11*a* from right in the medium width direction have been corresponded with the power supply circuit 22. Note that in FIG. 8, the numeral 2 depicted inside a nozzle 11*a* indicates that said nozzle 11*a* is corresponded with the power supply circuit 22, the numeral 3 depicted inside a nozzle 11*a* indicates that said nozzle 11*a* is corresponded with the power supply circuit 23, and the numeral 4 depicted inside a nozzle 11*a* indicates that said nozzle 11*a* is corresponded with the power supply circuit 24. In other words, it is depicted in FIG. 8 that regarding the pattern formed by ink droplets discharged onto the print medium M from all of the nozzles 11*a*, density has been measured for each of five dots consecutive in the medium width direction, and, as a result, the first through fifth nozzles 11*a* from right in the medium width direction belong to the third group, the sixth through twentieth nozzles 11*a* from right in the medium width direction belong to the second group, and the twenty-first through thirty-second nozzles 11*a* from right in the medium width direction belong to the first group.

Then, for each nozzle 11*a*, information related to position of said nozzle 11*a*, and the power supply circuit that has been corresponded to said nozzle 11*a* is stored in the nonvolatile memory 52. Now, in the provisional setting step S10, in each head 11, the power supply circuit to be associated with each nozzle 11*a* is provisionally determined based on the measurement result by the densitometer. In other words, in the provisional setting step S10, correction of density is performed within the head 11. However, in the case of a plurality of such heads 11 having been aligned in a zig-zag manner along the medium width direction, there is a possibility that densities will not necessarily be matched among the plurality of heads 11, and that, particularly in a region including a join of adjacent heads 11, there will occur a visually recognizable density variation. Accordingly, in the present embodiment, the test printing step S20 and density difference determining step S30 are further performed, and, if required, the setting adjusting step S40 is performed, subsequently to the temporary setting step S10. As a result, density differences occurring among the heads 11 are corrected.

Figure 9A:
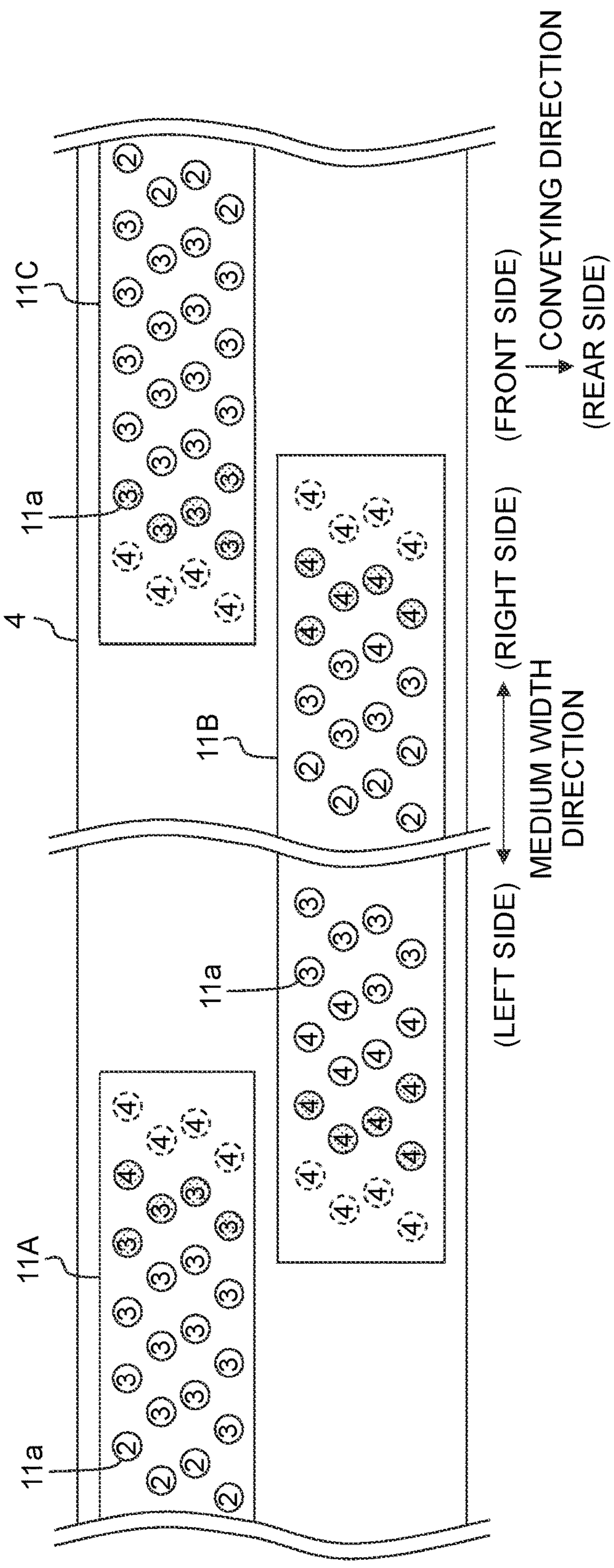
FIG. 9A depicts a plurality of the heads in which each of the nozzles is associated with one of the power supply circuits by the provisional setting step.

In the test printing step S20, for each line head 4, a test pattern is printed on the print medium M, in accordance with the correspondence of power supply circuits with each of the nozzles 11*a* that has been set in the provisional setting step S10. In the test printing step S20, first, the print medium M is moved in the conveying direction with respect to the line heads 4. Next, at a certain timing during conveying of the print medium M, ink droplets are discharged from each of the plurality of nozzles 11*a* of all heads 11 included in one line head 4. Specifically, the drive element 111 corresponding to each nozzle 11*a* is supplied with a voltage from the some one of the power supply circuits 22, 23, 24 that has been corresponded with said nozzle 11*a*, whereby a plurality of ink droplets is discharged from said nozzle 11*a*. Now, as depicted in FIG. 1, the 10 heads 11 included in each line head 4 are disposed in a zig-zag manner along the medium width direction. Moreover, right end portions of the five heads 11 disposed on the front side respectively overlap in the conveying direction left end portions of the five heads 11 disposed on the rear side. Moreover, left end portions of four of the heads 11 (the four heads 11 excluding the head 11 disposed furthest to the left) disposed on the front side respectively overlap in the conveying direction right end portions of four of the heads 11 (the four heads 11 excluding the head 11 disposed furthest to the right) disposed on the rear side. In other words, in each line head 4, there exist nine regions where fellow end portions in the medium width direction of two heads 11 overlap in the conveying direction. Moreover, as depicted in FIG. 9A, in the region where fellow end portions in the medium width direction of two heads 11 overlap in the conveying direction, eight of the nozzles 11*a* included in the head 11 on the front side respectively overlap in the conveying direction eight of the nozzles 11*a* included in the head 11 on the rear side. Therefore, the test printing step S20 and the later-mentioned actual printing step S50 are configured so that in the region where fellow end portions in the medium width direction of two heads 11 overlap in the conveying direction, ink will not be discharged from four of the nozzles 11*a* positioned in the left end portion of one of the heads 11 and from four of the nozzles 11*a* positioned in the right end portion of the other of the heads 11. In the description below, the four nozzles 11*a* positioned in the left end portion of one of the heads 11 and the four nozzles 11*a* positioned in the right end portion of the other of the heads 11 will be called non-discharging nozzles 11*a*, and in FIGS. 9A and 10, the non-discharging nozzles 11*a* are depicted by broken lines. Moreover, nozzles 11*a* other than the non-discharging nozzles 11*a* will sometimes be called discharging nozzles 11*a*. Moreover, a nozzle in the present teaching means the discharging nozzle 11*a*.

Figure 9B:
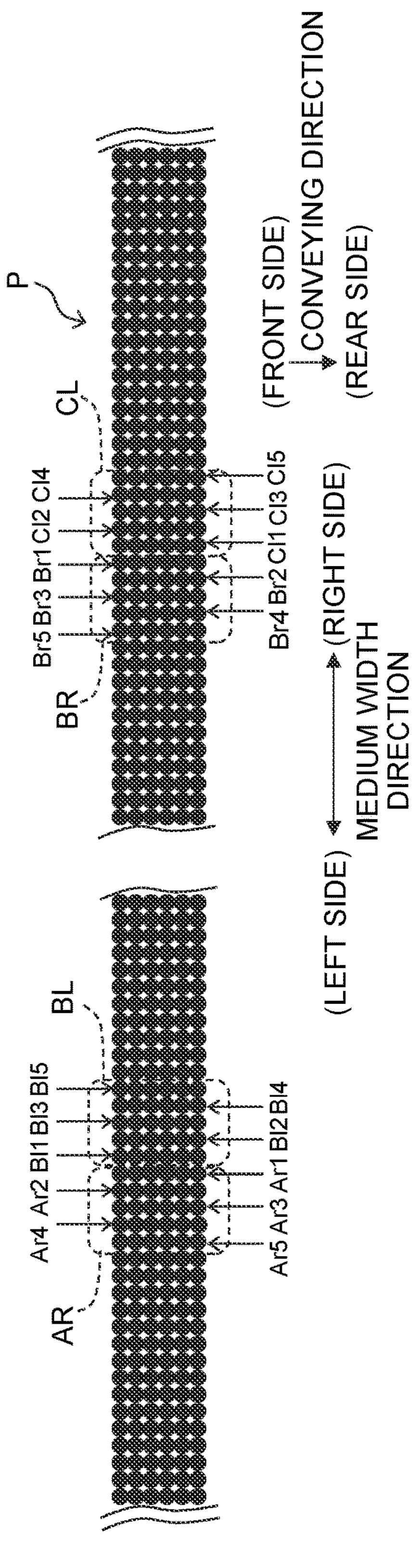
FIG. 9B depicts a test pattern formed by a test printing step being performed using the plurality of heads depicted in FIG. 9A.

In other words, in the test printing step S20, a plurality of ink droplets is caused to be discharged from all of the discharging nozzles 11*a* included in one line head 4, whereby, as depicted in FIG. 9B, a test pattern P having a rectangular shape long in the medium width direction is printed on the print medium M. Note that in FIG. 9B, dot columns Ar1-Ar5 extending in the conveying direction respectively indicate columns of dots formed by ink droplets that have been discharged from the hatched first through fifth nozzles 11*a* from right, among the discharging nozzles 11*a* of a head 11A depicted in FIG. 9A. Moreover, in FIG. 9B, dot columns B11-B15 extending in the conveying direction respectively indicate columns of dots formed by ink droplets that have been discharged from the hatched first through fifth nozzles 11*a* from left, among the discharging nozzles 11*a* of a head 11B depicted in FIG. 9A. Similarly, in FIG. 9B, dot columns Br1-Br5 extending in the conveying direction respectively indicate columns of dots formed by ink droplets that have been discharged from the hatched first through fifth nozzles 11*a* from right, among the discharging nozzles 11*a* of the head 11B depicted in FIG. 9A. Moreover, in FIG. 9B, dot columns C11-C15 extending in the conveying direction respectively indicate columns of dots formed by ink droplets that have been discharged from the hatched first through fifth nozzles 11*a* from left, among the discharging nozzles 11*a* of a head 11C depicted in FIG. 9A.

Next, in the density difference determining step (S30), for the test pattern P printed on the print medium M in the test printing step (S20), it is determined for each portion corresponding to a join of two heads 11 whether there has occurred a density difference ΔL* (specifically, a difference in lightness L* in an L*a*b* color space) of a certain value or more. For example, in the example depicted in FIG. 9B, for a portion corresponding to a join of the head 11A and the head 11B, of the test pattern P, that is, for each of a region AR consisting of the dot columns Ar1-Ar5 and region BL consisting of the dot columns B11-B15, of the test pattern P, density is measured by a densitometer, and it is determined whether the density difference ΔL* is 0.5 or more. Moreover, if the density difference ΔL* of the region AR and the region BL is 0.5 or more (S30: Yes), then the first through fifth nozzles 11*a* from right, of the discharging nozzles 11*a* of the head 11A and first through fifth nozzles 11*a* from left, of the discharging nozzles 11*a* of the head 11B will undergo execution of the later-mentioned setting adjusting step (S40). Then, after the setting adjusting step (S40) has been performed, a portion corresponding to the next join, that is, a portion corresponding to a join of the head 11B and the head 11C (a region BR consisting of the dot columns Br1-Br5 and region CL consisting of the dot columns C11-C15 depicted in FIG. 9B) undergoes execution of the density difference determining step (S30). On the other hand, if the density difference ΔL* of the region AR and the region BL is less than 0.5 (S30: No), then execution of the setting adjusting step (S40) is not performed, and the portion corresponding to the next join, that is, the portion corresponding to the join of the head 11B and the head 11C undergoes execution of the density difference determining step (S30). In this way, the density difference determining step (S30) is executed on all of the joins included in the line head 4. Note that length in the medium width direction of the portion corresponding to each join (for example, the portion consisting of the region AR and the region BL in FIG. 9B), of the test pattern P is 0.5 mm or more, and it is generally considered that when the density difference ΔL* is 0.5 or more in a range of 0.5 mm or more, the density difference ΔL* will be visually recognizable by the naked eye. Therefore, in the present embodiment, when the density difference ΔL* of the portion corresponding to each join is 0.5 or more, the setting adjusting step (S40) is executed so that the density difference ΔL* will be suppressed sufficiently for it to be visually unrecognizable by the naked eye.

In the setting adjusting step S40, the discharging nozzles 11*a* corresponding to a region where the density difference ΔL* has been determined to be 0.5 or more in the density difference determining step S30, are associated with an unused power supply circuit. As a result, the drive voltages of the drive elements 111 corresponding to said discharging nozzles 11*a* are adjusted. Description will be made below in line with a specific example depicted in FIGS. 9A, 9B, and 10. Note that in the description below, when "adjusting the drive voltage of a nozzle 11*a*" is mentioned, this means "adjusting the drive voltage of the drive element 111 corresponding to the nozzle 11*a*".

Figure 10:
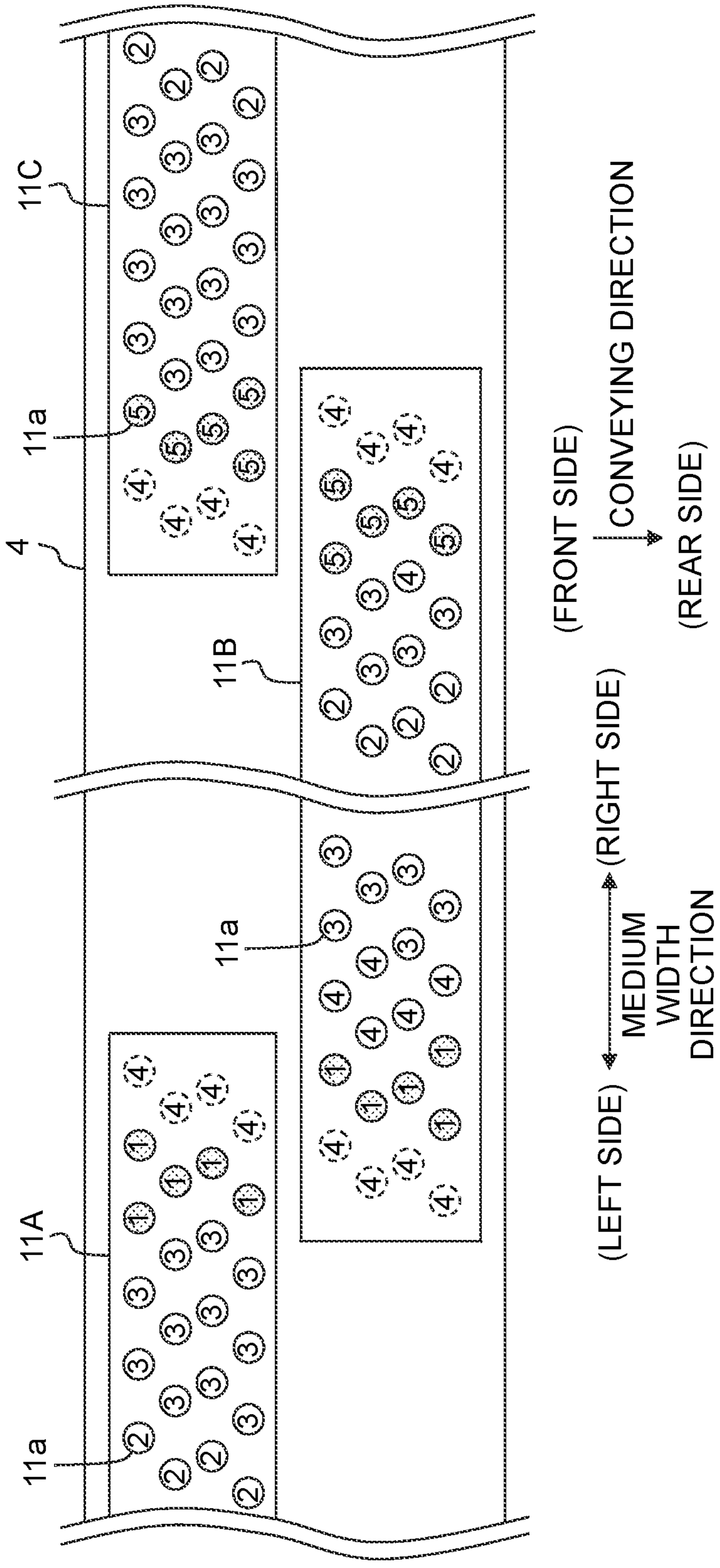
FIG. 10 is a diagram depicting a correspondence relationship of each of the nozzles and the power supply circuits after the plurality of heads of FIG. 9A has undergone a setting adjusting step.

Let it be assumed that as depicted in FIG. 9A, each nozzle 11*a* included in the heads 11A-11C is corresponded with some one of the power supply circuits 22-24 in the provisional setting step (S10). Moreover, let it be assumed that upon the test pattern P of the kind depicted in FIG. 9B having been printed on the print medium M in the test printing step (S20), the density difference ΔL* of the regions AR and BL has been determined to be 0.5 or more in the density difference determining step (S30). In this case, the drive voltages of the five nozzles 11*a* corresponding to the region AR (the hatched first through fifth nozzles 11*a* from right, among the discharging nozzles 11*a* of the head 11A) and the five nozzles 11*a* corresponding to the region BL (the hatched first through fifth nozzles 11*a* from left, among the discharging nozzles 11*a* of the head 11B) are adjusted. Of the five nozzles 11*a* corresponding to the region AR, one is associated with the power supply circuit 24 whose output voltage is 19 V, and four are associated with the power supply circuits 23 whose output voltage is 18 V. Therefore, an average value of output voltage of the power supply circuits associated with these five nozzles 11*a* will be 18.2 (=(19×1+18×4)/5) V On the other hand, of the five nozzles 11*a* corresponding to the region BL, five are associated with the power supply circuit 24 whose output voltage is 19 V. Therefore, an average value of output voltage of the power supply circuits associated with these five nozzles 11*a* will be 19 (=(19×5)/5) V. Accordingly, drive voltages of the five nozzles 11*a* corresponding to the region AR and the five nozzles 11*a* corresponding to the region BL are adjusted so as to approach 18.6 V which is a median value of 18.2 V and 19 V. For example, as depicted in FIG. 10, in the head 11A, the output voltage of the unused power supply circuit 21 is changed from 16 V to 18.4 V, and the five nozzles 11*a* corresponding to the region AR are allocated with the power supply circuit 21 that has had its output voltage changed. On the other hand, in the head 11B, the output voltage of the unused power supply circuit 21 is changed from 16 V to 18.8 V, and the five nozzles 11*a* corresponding to the region BL are allocated with the power supply circuit 21 that has had its output voltage changed. Note that in FIG. 10, the numeral 1 depicted inside a nozzle 11*a* indicates that said nozzle 11*a* is associated with the power supply circuit 21. As a result, the average value of drive voltage of the five nozzles 11*a* corresponding to the region AR will be 18.4 V, and the average value of drive voltage of the five nozzles 11*a* corresponding to the region BL will be 18.8 V. In other words, a difference of the average value of drive voltage of the five nozzles 11*a* corresponding to the region AR and average value of drive voltage of the five nozzles 11*a* corresponding to the region BL will become smaller than before the drive voltages are adjusted. As a result, the density difference ΔL* of the region AR and the region BL can be made smaller than before the drive voltages are adjusted. In other words, by the drive voltages of the five nozzles 11*a* corresponding to the region AR being set to 18.4 V, the region AR can have its density set to a density included in a range from density of the region AR to density of the region BL prior to the setting adjusting step (S40) being performed. Moreover, by the drive voltages of the five nozzles 11*a* corresponding to the region BL being set to 18.8 V, the region BL can have its density set to a density included in a range from density of the region AR to density of the region BL prior to the setting adjusting step (S40) being performed.

Furthermore, let it be assumed that in the region BR and region CL of the test pattern P depicted in FIG. 9B, the density difference ΔL* has been determined to be 0.5 or more. In this case, the drive voltages of the five nozzles 11*a* corresponding to the region BR (the hatched first through fifth nozzles 11*a* from right, of the discharging nozzles 11*a* of the head 11B) and the five nozzles 11*a* corresponding to the region CL (the hatched first through fifth nozzles 11*a* from left, of the discharging nozzles 11*a* of the head 11C) are adjusted. As depicted in FIG. 9A, of the five nozzles 11*a* corresponding to the region BR, five are associated with the power supply circuit 24 whose output voltage is 19 V. Therefore, an average value of output voltage of the power supply circuits associated with these five nozzles 11*a* will be 19 (=(19×5)/5) V. On the other hand, of the five nozzles 11*a* corresponding to the region CL, five are associated with the power supply circuit 23 whose output voltage is 18 V. Therefore, an average value of output voltage of the power supply circuits associated with these five nozzles 11*a* will be 18 (=(18×5)/5) V. Accordingly, drive voltages of the five nozzles 11*a* corresponding to the region BR and the five nozzles 11*a* corresponding to the region CL are adjusted so as to approach 18.5 V which is a median value of 19 V and 18 V. For example, as depicted in FIG. 10, in the head 11B, the output voltage of the unused power supply circuit 25 is changed from 20 V to 18.7 V, and the five nozzles 11*a* corresponding to the region BR are allocated with the power supply circuit 25 that has had its output voltage changed. On the other hand, in the head 11C, the output voltage of the unused power supply circuit 25 is changed from 20 V to 18.3 V, and the five nozzles 11*a* corresponding to the region CL are allocated with the power supply circuit 25 that has had its output voltage changed. Note that in FIG. 10, the numeral 5 depicted inside a nozzle 11*a* indicates that said nozzle 11*a* is associated with the power supply circuit 25. As a result, the average value of drive voltage of the five nozzles 11*a* corresponding to the region BR will be 18.7 V, and the average value of drive voltage of the five nozzles 11*a* corresponding to the region CL will be 18.3 V. In other words, a difference of the average value of drive voltage of the five nozzles 11*a* corresponding to the region BR and average value of drive voltage of the five nozzles 11*a* corresponding to the region CL will become smaller than before the drive voltages are adjusted. As a result, the density difference ΔL* of the region BR and the region CL can be made smaller than before the drive voltages are adjusted. In other words, by the drive voltages of the five nozzles 11*a* corresponding to the region BR being set to 18.7 V, the region BR can have its density set to a density included in a range from density of the region BR to density of the region CL prior to the setting adjusting step (S40) being performed. Moreover, by the drive voltages of the five nozzles 11*a* corresponding to the region CL being set to 18.3 V, the region CL can also have its density set to a density included in a range from density of the region BR to density of the region CL prior to the setting adjusting step (S40) being performed.

As described above, the density difference determining step (S30) is executed on all of the joins included in one line head 4, and joins where the density difference ΔL* has been determined to be 0.5 or more undergo execution of the setting adjusting step (S40). Then, the correspondence relationship of the nozzles 11*a* and power supply circuits that has been changed in the setting adjusting step (S40) is stored in the nonvolatile memory 52. Then, after the above-described steps have been completed for all of the line heads 4, the actual printing step (S50) is executed. In the actual printing step (S50), a voltage is supplied to the drive element 111 corresponding to each nozzle 11*a*, in accordance with correspondence information of the power supply circuits stored in the nonvolatile memory 52. Then, ink droplets are discharged from each nozzle 11*a*, whereby printing is performed on the print medium M.

In the specific example described above, the head 11A and head 11B are one example of "a first ink jet head and second ink jet head" of the present teaching, and the head 11B and head 11C are another one example of "a first ink jet head and second ink jet head" of the present teaching. The first through fifth nozzles 11*a* from right, of the discharging nozzles 11*a* of the head 11A are one example of "a plurality of first nozzles positioned in an end portion on one side in the first direction, of the plurality of nozzles that the first ink jet head includes" of the present teaching, and the first through fifth nozzles 11*a* from left, of the discharging nozzles 11*a* of the head 11B are one example of "a plurality of second nozzles positioned in an end portion on the other side in the first direction, of the plurality of nozzles that the second ink jet head includes" of the present teaching. Moreover, the first through fifth nozzles 11*a* from right, of the discharging nozzles 11*a* of the head 11B are one example of "a plurality of first nozzles positioned in an end portion on one side in the first direction, of the plurality of nozzles that the first ink jet head includes" of the present teaching, and the first through fifth nozzles 11*a* from left, of the discharging nozzles 11*a* of the head 11C are one example of "a plurality of second nozzles positioned in an end portion on the other side in the first direction, of the plurality of nozzles that the second ink jet head includes" of the present teaching. The regions AR and BL in the test pattern P are one example of "a first image region" and "a second image region" of the present teaching, and the regions BR and CL in the test pattern P are another one example of "a first image region" and "a second image region" of the present teaching. The drive voltage 18.4 V of the five nozzles 11*a* corresponding to the region AR and drive voltage 18.8 V of the five nozzles 11*a* corresponding to the region BL, subsequent to the setting adjusting step (S40) are one example of "a first voltage" and "a second voltage" of the present teaching. Moreover, the drive voltage 18.7 V of the five nozzles 11*a* corresponding to the region BR and drive voltage 18.3 V of the five nozzles 11*a* corresponding to the region CL, subsequent to the setting adjusting step (S40) are another one example of "a first voltage" and "a second voltage" of the present teaching.

The above-described embodiment of the present teaching results in that, after the drive voltage of each nozzle 11*a* has been adjusted in the provisional setting step (S10) so as to prevent density variation occurring within each head 11, solely a join of two heads 11 where the density difference ΔL* has been determined to be 0.5 or more in the density difference determining step (S30) undergoes execution of the setting adjusting step (S40). Therefore, the density difference ΔL* of the join of said two heads 11 can be more efficiently eased, compared to when the drive voltages of all of the discharging nozzles 11*a* included in the two heads 11 are adjusted. Moreover, overall lowering of discharge speeds of the ink droplets, generation of mist, and so on, of the kind that occur when drive voltages of all of the discharging nozzles 11*a* included in said two heads 11 are adjusted, can be suppressed.

Moreover, in the present embodiment, length in the medium width direction of the portion corresponding to each join of the test pattern P is 0.5 mm or more, and the setting adjusting step (S40) is executed only in the case of density difference ΔL* in such a portion being 0.5 or more. In other words, adjustment for easing the density difference ΔL* is performed solely on a portion where there has occurred a density difference ΔL* visually recognizable by the naked eye. Therefore, adjustment can be performed more efficiently, compared to when the drive voltages of all of the discharging nozzles 11*a* included in the head 11 are adjusted.

That concludes description of the embodiment of the present teaching. However, the present teaching is not limited to the above-described embodiment, and may undergo a variety of design changes within a range described in the claims.

Figure 11:
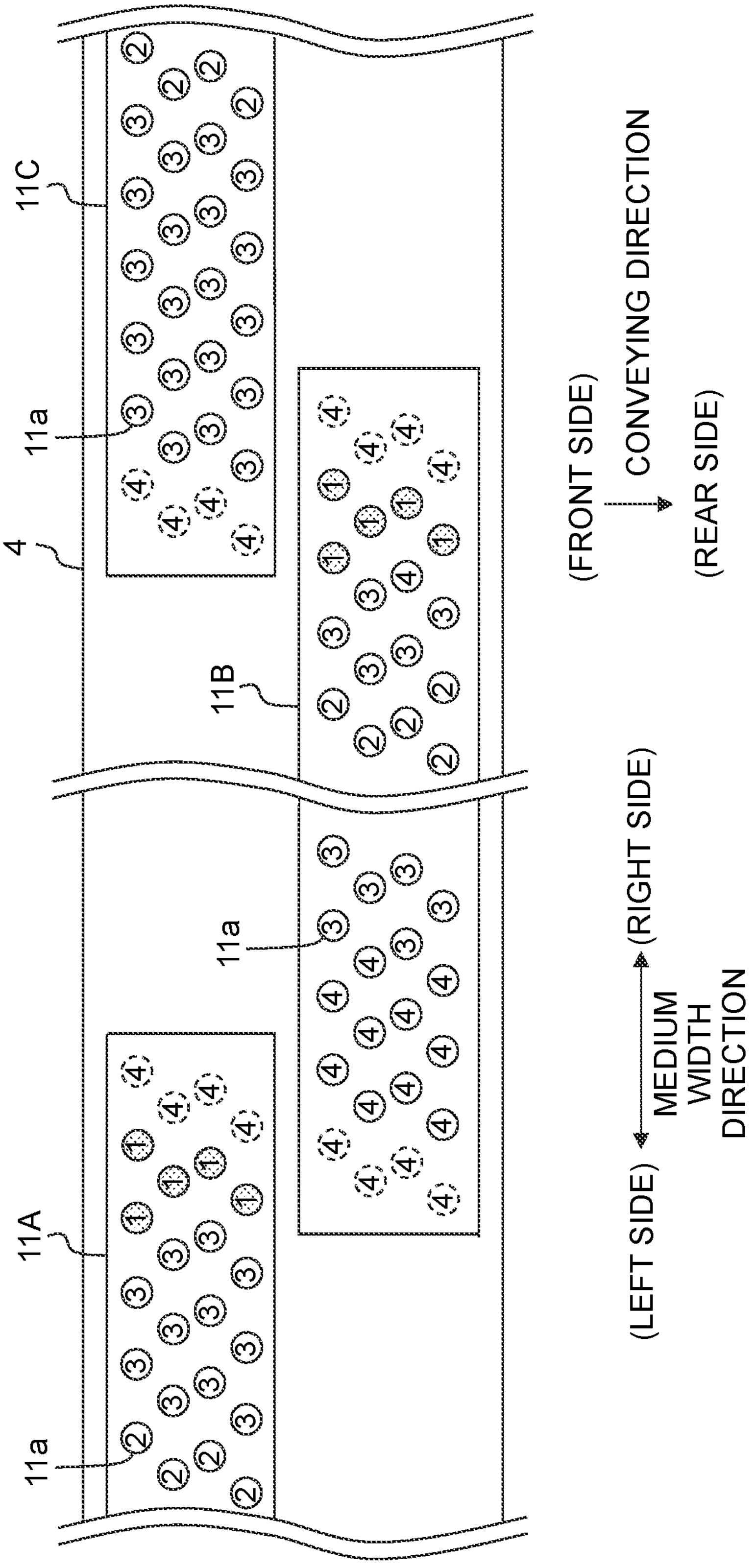
FIG. 11 is a diagram corresponding to FIG. 10 in a modified example.

In the above-described embodiment, when the density difference ΔL* of a portion corresponding to a join of two heads 11 within the test pattern P was 0.5 or more, said two heads 11 both underwent adjustment of their drive voltages. However, it is possible that only either one of said two heads 11 undergoes adjustment of its drive voltages. For example, let it be assumed that in the provisional setting step (S10), the power supply circuits have been allocated to each nozzle 11*a* as depicted in FIG. 9A, in the test printing step (S20), a test pattern P of the kind depicted in FIG. 9B has been printed, and in the density difference determining step (S30), the density difference ΔL* of the region AR and region BL and density difference ΔL* of the region BR and region CL are both 0.5 or more. In this case, the density difference ΔL* of the region AR and region BL may be eased by the drive voltages of the five nozzles 11*a* corresponding to the region AR alone being adjusted, as depicted in FIG. 11, for example. Specifically, in the head 11A, the output voltage of the unused power supply circuit 21 may be changed to 18.6 V being the median value of 18.2 V and 19 V, and the five nozzles 11*a* corresponding to the region AR may be allocated with the power supply circuit 21 that has had its output voltage changed. Thereby, the average value of drive voltage of the five nozzles 11*a* corresponding to the region AR will be 18.6 V, and the difference of the average value of drive voltage of the five nozzles 11*a* corresponding to the region AR and average value of drive voltage of the five nozzles 11*a* corresponding to the region BL will become smaller than before the drive voltages are adjusted. As a result, the density difference ΔL* of the region AR and region BL can be made smaller than before the drive voltages are adjusted. In other words, by the drive voltages of the five nozzles 11*a* corresponding to the region AR being set to 18.6 V, the region AR can have its density set to a density in-between density of the region AR and density of the region BL prior to the setting adjusting step (S40) being performed. Similarly, the density difference ΔLT* of the region BR and region CL may be eased by the drive voltages of the five nozzles 11*a* corresponding to the region BR alone being adjusted, as depicted in FIG. 11, for example. Specifically, in the head 11B, the output voltage of the unused power supply circuit 21 may be changed to 18.5 V being the median value of 19 V and 18 V, and the five nozzles 11*a* corresponding to the region BR may be allocated with the power supply circuit 21 that has had its output voltage changed. Thereby, the average value of drive voltage of the five nozzles 11*a* corresponding to the region BR will be 18.5 V, and the difference of the average value of drive voltage of the five nozzles 11*a* corresponding to the region BR and average value of drive voltage of the five nozzles 11*a* corresponding to the region CL will become smaller than before the drive voltages are adjusted. As a result, the density difference ΔL* of the region BR and region CL can be made smaller than before the drive voltages are adjusted. In other words, by the drive voltages of the five nozzles 11*a* corresponding to the region BR being set to 18.5 V, the region BR can have its density set to a density in-between density of the region BR and density of the region CL prior to the setting adjusting step (S40) being performed.

In each line head 4 of the above-described embodiment and above-described modified example, there existed nine regions where fellow end portions in the medium width direction of two heads 11 overlapped in the conveying direction. Moreover, in the region where fellow end portions in the medium width direction of two heads 11 overlapped in the conveying direction, eight nozzles 11*a* included in the head 11 on the front side respectively overlapped in the conveying direction eight nozzles 11*a* included in the head 11 on the rear side. However, the number of nozzles 11*a* in a group of nozzles 11*a* overlapping in the conveying direction is not limited to eight, and may be seven or less, or may be nine or more. Moreover, in the above-described embodiment and above-described modified example, in the region where fellow end portions in the medium width direction of two heads 11 overlapped in the conveying direction, four nozzles 11*a* positioned in the left end portion of one of the heads 11 and four nozzles 11*a* positioned in the right end portion of the other of the heads 11 were configured as non-discharging nozzles 11*a*. However, the number of non-discharging nozzles 11*a* is not limited to four, and may be three or less, or may be five or more. Moreover, n nozzles 11*a* (where n is a natural number) positioned in the left end portion of one of the heads 11 may be configured as non-discharging nozzles 11*a*, and n nozzles 11*a* positioned in the right end portion of the other of the heads 11 configured as discharging nozzles 11*a*. Alternatively, n nozzles 11*a* (where n is a natural number) positioned in the left end portion of one of the heads 11 may be configured as discharging nozzles 11*a*, and n nozzles 11*a* positioned in the right end portion of the other of the heads 11 configured as non-discharging nozzles 11*a*.

In the above-described embodiment and above-described modified examples, length in the medium width direction of the portion corresponding to each join (for example, the portion consisting of the region AR and the region BL in FIG. 9B), of the test pattern P was 0.5 mm or more, but is not limited to this, and may be 0.2 mm or more.

The printing apparatus 1 in the above-described embodiment and above-described modified examples was configured so that the four line heads 4 fixed to the casing 2 had the print medium M conveyed under them in the conveying direction by the conveying rollers 5A, 5B. However, the printing apparatus 1 in the above-described embodiment and above-described modified examples is not limited to this, and may be configured so that the print medium M placed on the platen 3 has the line heads 4 moved over it in the conveying direction.

The print medium M is not limited to paper, and may be a resin-made film or a fabric, for example.

What is claimed is:

1. A method for correcting an image, comprising:

moving first and second ink jet heads and a medium relative to each other, the first and second ink jet heads being arranged along a first direction, each of the first and second ink jet heads including nozzles and drive elements corresponding to the nozzles respectively, the first and second ink jet heads and the medium being moved relative to each other in a second direction intersecting with the first direction;

discharging ink droplets from the nozzles of the first and second ink jet heads, by connecting each of the drive elements to one of power supply circuits and by applying voltage to each of the drive elements at a predetermined timing while moving the first and second ink jet heads and the medium in the second direction, the power supply circuits having different output voltage values to each other;

determining a density difference between a first image region and a second image region, the first image region being formed on the medium by the ink droplets discharged from first nozzles, the first nozzles being included in the nozzles of the first ink jet head and being positioned in an end portion on one side in the first direction among the nozzles of the first ink jet head, the second image region being formed on the medium by the ink droplets discharged from second nozzles, the second nozzles being included in the nozzles of the second ink het head and being positioned in an end portion on the other side in the first direction among the nozzles of the second ink jet head; and switching the voltage to be applied to first drive elements to a first voltage by switching the power supply circuits to be connected to the first drive elements based on the density difference, the first drive elements being included in the drive elements of the first ink jet head and corresponding to the first nozzles, the first voltage being different from the voltage to be applied to drive elements, of the first ink jet head, other than the first drive elements.

2. The method for correcting an image according to claim 1, wherein in a case of applying the first voltage to the first drive elements, density of an image region formed on the medium by the ink droplets discharged from the first nozzles is included in a range of density from density of the first image region to density of the second image region.

3. The method for correcting an image according to claim 2, wherein in the case of applying the first voltage to the first drive elements, the density of the image region formed on the medium by the ink droplets discharged from the first nozzles is an intermediate density between the density of the first image region and the density of the second image region.

4. The method for correcting an image according to claim 1, wherein the power supply circuits to be connected to the first drive elements are switched, without switching the power supply circuits to be connected to second drive elements corresponding to the second nozzles.

5. The method for correcting an image according to claim 1, further comprising switching the voltage to be applied to second drive elements to a second voltage by switching the power supply circuits to be connected to the second drive elements based on the density difference, the second drive elements being included in the drive elements of the second ink jet head and corresponding to the second nozzles, the second voltage being different from the voltage to be applied to drive elements, of the second ink jet head, other than the second drive elements.

6. The method for correcting an image according to claim 1, wherein density of the first image region and density of the second image region are measured by a densitometer, and the density difference is determined based on a measured result.

7. The method for correcting an image according to claim 1, wherein length, in the first direction, of a region consisting of the first image region and the second image region is 0.2 mm or more.

8. The method for correcting an image according to claim 1, wherein in a case that the density difference between the first image region and second image region is 0.5 or more, the voltage to be applied to the first drive elements is switched to the first voltage.

9. A printing apparatus comprising:

power supply circuits having different output voltage values to each other;

first and second ink jet heads arranged along a first direction, each of the first and second ink jet heads including nozzles and drive elements corresponding to the nozzles respectively;

a moving mechanism configured to move the first and second ink jet heads and a medium relative to each other in a second direction intersecting with the first direction; and a controller configured to control the first and second ink jet heads and the moving mechanism, wherein each of the drive elements included in the first and second ink jet heads is connected to one of the power supply circuits, the controller is configured to apply voltage to each of the drive elements included in the first and second ink jet heads at a predetermined timing while moving the first and second ink jet heads and the medium in the second direction relative to each other such that ink droplets are discharged from the nozzles included in the first and second ink jet heads, the nozzles of the first ink jet head include first nozzles positioned in an end portion on one side in the first direction, the nozzles of the second ink jet head include second nozzles positioned in an end portion on the other side in the first direction, a first image region is formed on the medium by the ink droplets discharged from the first nozzles, a second image region is formed on the medium by the ink droplets discharged from the second nozzles, the drive elements of the first ink jet head include first drive elements corresponding to the first nozzles, and the controller is configured to switch the voltage to be applied to the first drive elements to a first voltage by switching the power supply circuits to be connected to the first drive elements based on a density difference between the first image region and the second image region, the first voltage being different from the voltage to be applied to drive elements, of the first ink jet head, other than the first drive elements.

* * * * *